US010616336B1

(12) United States Patent
Zelenov et al.

(10) Patent No.: US 10,616,336 B1
(45) Date of Patent: Apr. 7, 2020

(54) FILE ACCESS SERVICE

(71) Applicant: Parallels International GmbH, Schaffhausen (CH)

(72) Inventors: Anton Zelenov, Moscow (RU); Nikolay Dobrovolskiy, Moscow (RU); Serguei M. Beloussov, Singapore (SG)

(73) Assignee: Parallels International GmbH, Schaffhausen (CH)

( * ) Notice: Subject to any disclaimer, the term of this patent is extended or adjusted under 35 U.S.C. 154(b) by 534 days.

(21) Appl. No.: 15/271,070

(22) Filed: Sep. 20, 2016

(51) Int. Cl.
*G06F 15/173* (2006.01)
*H04L 29/08* (2006.01)

(52) U.S. Cl.
CPC .......... *H04L 67/1097* (2013.01); *H04L 67/06* (2013.01)

(58) Field of Classification Search
CPC . H04L 67/1008; H04L 67/06; H04L 67/1097; H04L 63/0428; H04L 63/06; H04L 9/30; G06F 17/30067; G06F 17/30203; G06F 21/6209; G06F 2221/2141
USPC ................................................. 709/223, 225
See application file for complete search history.

(56) References Cited

U.S. PATENT DOCUMENTS

| 2002/0083183 A1* | 6/2002 | Pujare ....................... G06F 8/65 709/231 |
| 2007/0022087 A1* | 1/2007 | Bahar ................... G06F 9/5011 |
| 2012/0185437 A1* | 7/2012 | Pavlov ................ G06F 11/1076 707/652 |
| 2015/0088890 A1* | 3/2015 | Hoffert ............... G06F 16/1744 707/737 |
| 2017/0293766 A1* | 10/2017 | Schnjakin ........... H04L 67/1097 |

* cited by examiner

*Primary Examiner* — Wing F Chan
*Assistant Examiner* — Andrew Woo
(74) *Attorney, Agent, or Firm* — Lowenstein Sandler LLP

(57) ABSTRACT

Systems and methods for facilitating access to files that are stored by network-accessible file storage services. An example system comprises a plurality of file access nodes including a control node, wherein the control node is configured to: receive a file access request initiated by a client, wherein the file access request comprises an identifier of a file, an identifier of a file storage service, and an access token associated with the file stored by the file storage service; request, using the access token, metadata associated with the file from the file storage service; define, using the metadata, a plurality of portions forming the file; and forward, to the plurality of file access nodes, identifiers of the plurality of portions.

19 Claims, 6 Drawing Sheets

FILE ACCESS SERVICE

TECHNICAL FIELD

The present disclosure relates to file access methods, and more particularly, to file access services facilitating access to files that are stored by network-accessible file storage services.

BACKGROUND

"File storage service" herein shall refer to a public or private network-accessible service that is capable of servicing users' requests with respect to storing or retrieving files identified by their respective file names.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Described herein are systems and methods for facilitating access to files that are stored by network-accessible file storage services.

A user may employ one or more public or private file storage services for storing and retrieving various files, e.g., electronic documents, media content files, executable files, etc. However, most file storage services would only provide the basic file access functionality, e.g., streaming a file to a client computing device over a single connection, with or without the ability to re-start and continue an interrupted download session at a specified position within the file. Even if the file storage service supports streaming a file to a client computing device over multiple simultaneous connections, the overall download performance is limited by the bandwidth of the client's network connection to the service.

Systems and methods of the present disclosure improve the reliability and efficiency of the file access operations by providing a file access service that includes a plurality of file access nodes, each of which may, independently of its peer file access nodes, serve to the client at least a portion of the requested file, by retrieving the portion of the file from the local cache or by acting as a proxy in streaming the portion of the file from the file storage service to the client, while optionally storing in the local cache the file portion being streamed.

Responsive to receiving a file access request initiated by a client computing device, each of the file access nodes may determine the number of file portions that it may stream to the requesting client without deteriorating own performance metrics beyond certain pre-determined thresholds, as described in more details herein below. Conversely, the client-side logic distributes the file access requests among multiple file access nodes, as described in more details herein below. Thus, the systems and methods described herein represent improvements to the functionality of general purpose or specialized computing devices, by providing a file access service that optimizes the bandwidth usage by each of the file access nodes and the client computing device, while providing the reliable file access operations irrespective of one or more file access node failures.

The systems and methods described herein may be implemented by hardware (e.g., general purpose and/or specialized processing devices, and/or other devices and associated circuitry), software (e.g., instructions executable by a processing device), or a combination thereof. While the illustrative examples described herein below reference file download operations, same or similar methods may, without limitation, be applied to performing file upload operations. Various aspects of the above referenced methods and systems are described in details herein below by way of examples, rather than by way of limitation.

Figure 1:
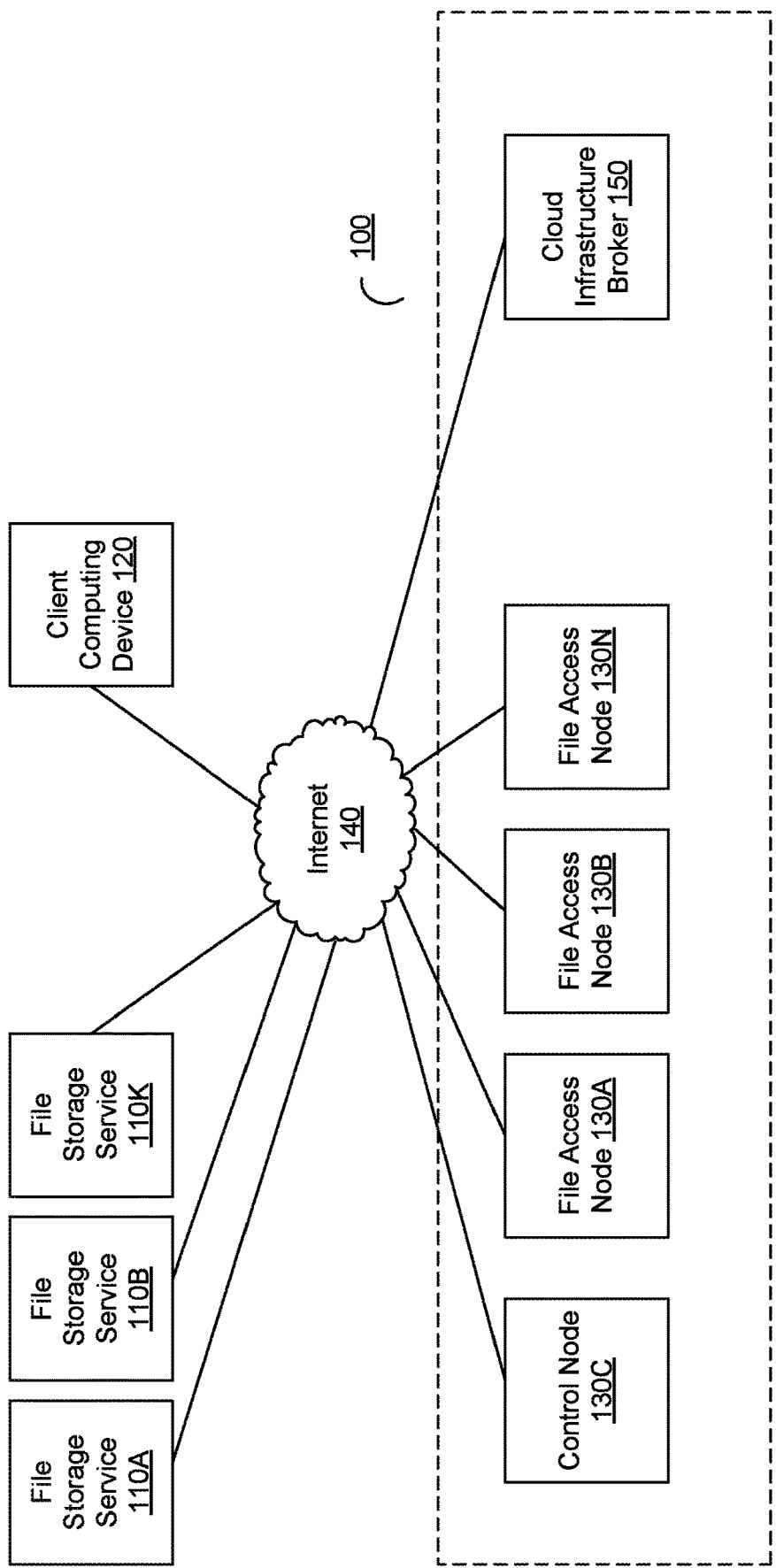
FIG. 1 depicts a high-level network diagram of an example distributed computer system, in which the systems and methods described herein may be implemented.

FIG. 1 depicts a high-level network diagram of an example distributed computer system 100, in which the systems and methods described herein may be implemented. As schematically illustrated by FIG. 1, a user of a public or private file storage service 110 may need to access, by the client computing device 120, one or more files residing on the file storage service 110. In various illustrative examples, the client computing device 120 may be provided by a mobile computing device (such as a smartphone), a personal computer, or by any other suitable computing device equipped with a network interface and a user interface (such as a graphical user interface).

In certain implementations, the file storage service 110 may provide the basic file access functionality, e.g., streaming a file to the client computing device 120 over a single connection, and the ability to re-start and continue an interrupted download session at a specified position within the file. In accordance with one or more aspects of the present invention, the file download operations with respect to a user-requested file may be performed by two or more file access nodes 130A-130N coordinated by the control node 130C, thus improving the overall efficiency and reliability of the file access operations.

Each of file access nodes 130A-130N may, independently of other file access nodes, serve to the client computing device 120 at least a portion of the requested file, by retrieving the portion of the file from the local cache or by acting as a proxy in streaming the portion of the file from the file storage service 110 to the client computing device 120, while optionally storing in the local cache the file portion being streamed. Each file access node 130 may be communicatively coupled to the Internet 140 via one or more routers, firewalls, load balancers, and/or other auxiliary components that are omitted from FIG. 1 for clarity. At least one of the file access nodes 130, denoted herein as node 130C, may be designated as a control node, and may coordinate the activities performed by other file access nodes, as described in more details herein below. In certain implementations, the control node may further act as a file access node with respect to at least certain client computing devices and/or at least certain files.

The distributed computer system 100 may further comprise one or more cloud infrastructure brokers 150 employed to communicate with client computing devices 120 and coordinate the operation of various components of the example distributed computer system 100. While the cloud infrastructure broker 150 can be installed on a dedicated hardware server, one or more cloud infrastructure brokers 150 may alternatively be collocated with a file access node 130 (e.g., the control node 130C) on a single hardware server. In certain implementations, the distributed computer system 100 may further comprise various additional components which have been omitted from FIG. 1 for conciseness and clarity.

Figure 2:
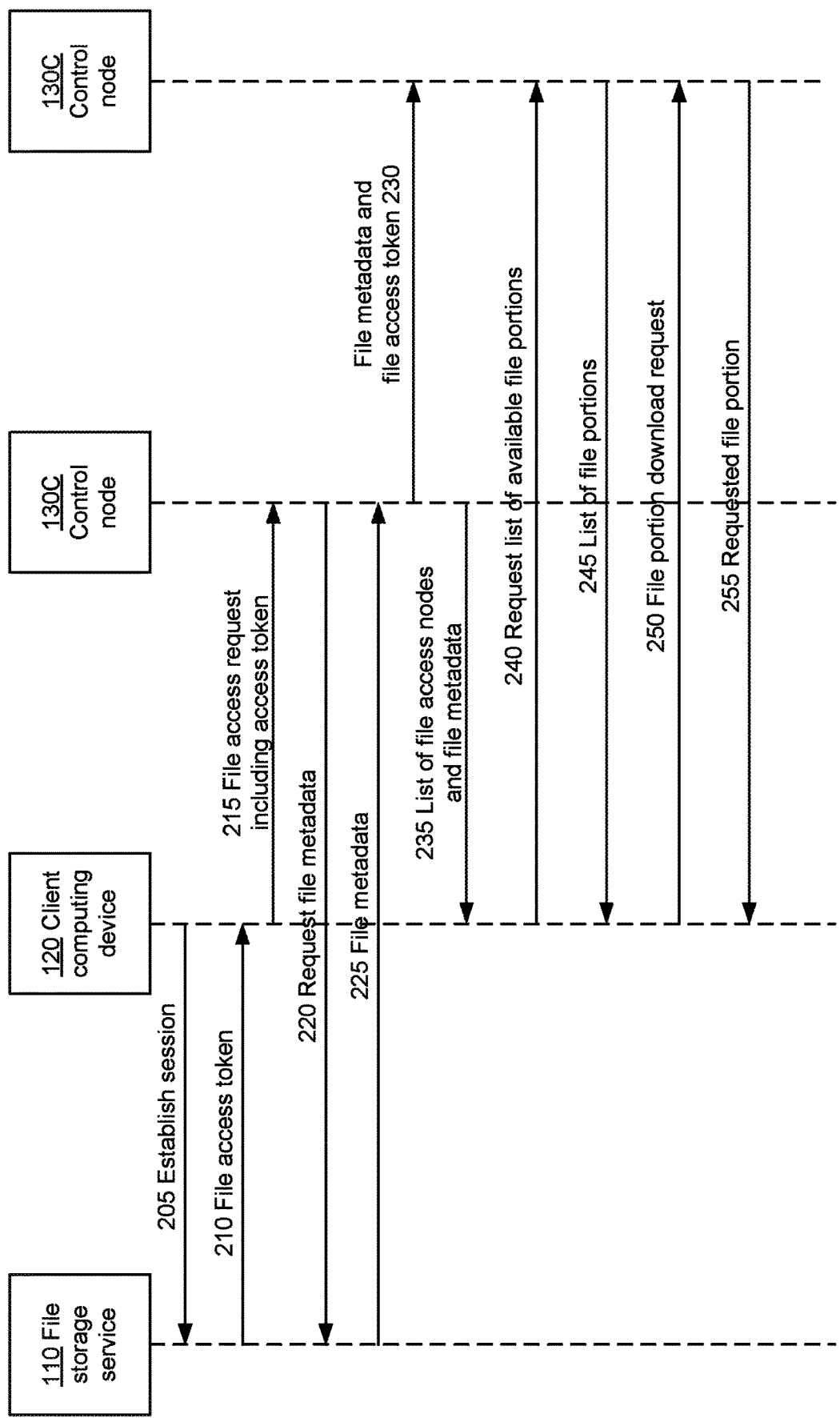
FIG. 2 schematically illustrates an example sequence diagram of a workflow facilitating access to files that are stored by network-accessible file storage services, in accordance with one or more aspects of the present disclosure.

FIG. 2 schematically illustrates an example sequence diagram 200 of a workflow facilitating access to files that are stored by network-accessible file storage services, in accordance with one or more aspects of the present disclosure. As schematically illustrated by FIG. 2, the client computing device 120 may, upon successfully establishing a session (205) with the file storage service 110, receive (210) one or more session keys, file access tickets, and/or other digital artifacts (referred to herein as "access tokens") that may be presented to the file storage service 110 for receiving access to one or more user-specified files. The client computing device 120 may then securely transmit (215) the access tokens to the control node 130C (e.g., via the cloud infrastructure broker 150, which is omitted from FIG. 2 for conciseness and clarity), in association with a file access request identifying one or more files and the file storage service 110 that stores the requested files.

Responsive to receiving the file access request, the control node 130C may utilize the received access token to request (220) the file storage service 110 to provide, for each file specified by the file access request, the metadata associated with the file. The file metadata (225) may include the file size and other parameters of the file.

The control node 130C may then identify one or more file access nodes 130 that may be employed to serve portions of the file to the client computing device 120. In an illustrative example, the control node may identify a certain number of file access nodes that currently have the minimal, among all nodes, workload. Alternatively, the control node may identify a subset of the file access nodes 130 that are geographically closest to the client computing device 120. The number of control nodes may be determined based on the file size, e.g., by dividing the file size by a pre-determined value. Alternatively, the control node may identify all available file access nodes 130. As noted herein above, the control node may further act as a file access node with respect to at least certain client computing devices and/or at least certain files.

Responsive to identifying the file access nodes to serve the client request, the control node 130C may forward (230) the file metadata and the file access token to the identified file access nodes 130. The file metadata may include the file size, the size of a portion of the file to be transmitted to the client computing device, and/or a list of identifiers of the file portions. A file portion may be identified by its ordinal number in the sequence of file portions of a given file and/or by the offset of the respective portion relative to the top of the file. The control node 130C may further forward (235) a list of identified file access nodes and the file metadata to the client computing device 120 (e.g., via the cloud infrastructure broker 150).

Responsive to receiving the list of file access nodes designated for servicing the current file access request, the client computing device 120 may select one or more file access nodes for further requesting portions of the file. In an illustrative example, the client computing device 120 may ping the file access nodes and select one or more nodes demonstrating the best response time. In another illustrative example, the client computing device 120 may select one or more nodes associated with the network connections having the maximum available bandwidth among the network connections to the plurality of file access nodes. The client computing device 120 may then poll (240) the selected file access nodes 130 to request a list of available file portions.

A file access node 130 being polled may optionally ascertain whether any of the file portions are stored in the local cache, and if so, return (245) to the client computing device a list of identifiers of such file portions. Additionally or alternatively, the file access node 130 may determine the number of file portions that it may stream to the client computing device 120 without deteriorating own performance metrics beyond certain pre-determined thresholds. In an illustrative example, the file access node 130 may estimate the available network bandwidth to the file storage service 110 and to the client computing device 120 and/or the round-trip time to the file storage service 110 and to the client computing device 120. Should the available network bandwidth exceed a first pre-defined threshold and the round trip times fall below a second pre-defined threshold, the file access node 130 may determine the number of the file portions to be served to the client computing device 120. In an illustrative example, the file access node 130 may determine the number of file portions to be served as being proportional to the ratio of the difference of the available network bandwidth and the first pre-defined threshold to the file portion size. Responsive to estimating the number of the file portions to be served, the file access node 130 may return (245) to the client computing device a list of identifiers of the file portions that the file access node 130 is prepared to serve. In an illustrative example, the file access node 130 may randomly generate the requisite number of identifiers of the file portions, thus minimizing the probability of the client computing device receiving the same or substantially similar lists of file portion identifiers from two or more file access nodes 130.

Responsive to receiving the list of the file portion identifiers, the client computing device 120 may identify the file portions that it still is missing, and transmit to the corresponding file access node 130 a file portion download request (250) specifying the identified file portions. The file access node 130 may respond (255) by transmitting the requested file portion to the client computing device 120. In an illustrative example, the file access node 130 may retrieve the requested file portion from the local cache. Alternatively, responsive to failing to retrieve the requested file portion from the local cache, the file access node 130 may stream the requested file portion from the file storage service to the client computing device 120, while optionally storing in the local cache the file portion being streamed. The workflow terminates when the client computing device 120 determines that it has all the portions of the requested file.

In certain implementations, the control node 130C may perform real-time monitoring of the workload of the plurality of file access nodes 130. In an illustrative example, responsive to determining that the workload of one or more file access nodes 130 exceeds a certain threshold value, the control node 130 may initiate provisioning of one or more additional file access nodes (e.g., switch one or more standby file access nodes to an active state and/or configure new hosts for acting as file access nodes). The workload may be estimated using peak or aggregated values of one or more performance metrics, including, for example, the utilized network bandwidth, the CPU load, the utilized disk space, etc.

In certain implementations, the control node 130 may prevent the overall system performance deterioration by initiating provisioning of one or more additional file access nodes in anticipation of a spike in the client activity. In an illustrative example, the control node may predict the file access nodes workload level based on analyzing historic data reflecting the workload of one or more file access nodes.

Figure 3:
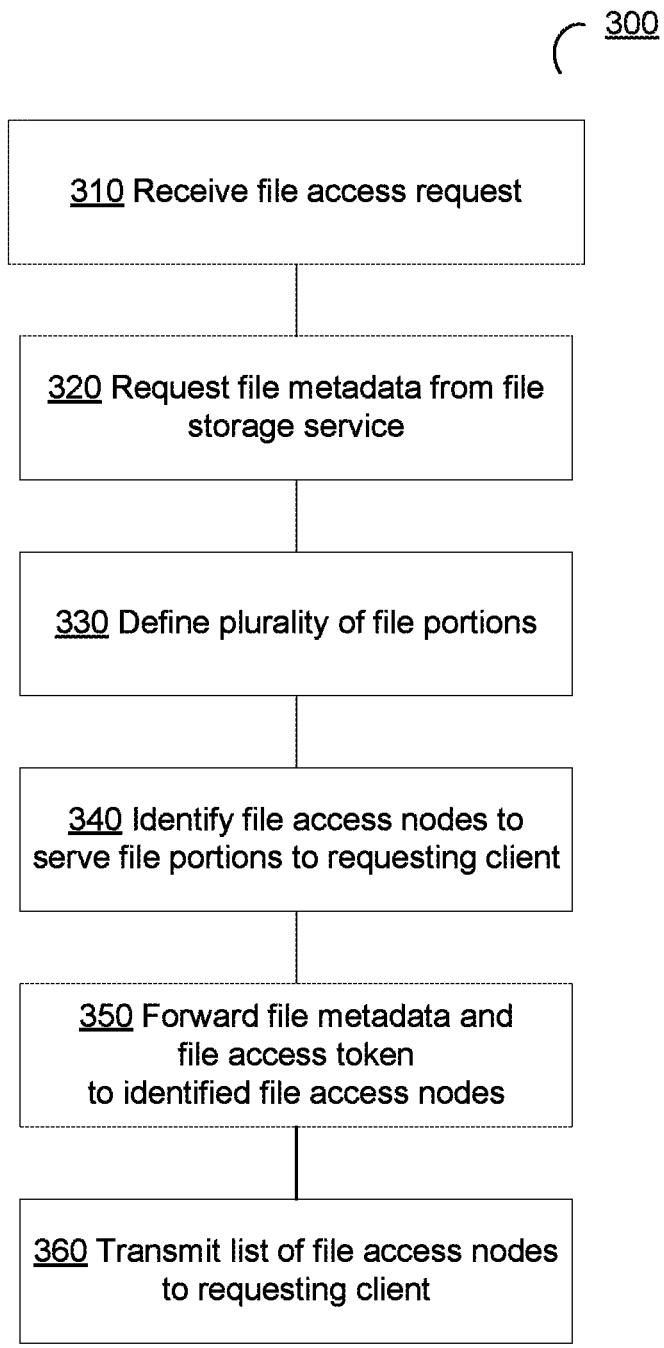
FIG. 3 depicts a flow diagram of one illustrative example of method performed by a control node for facilitating access to files that are stored by network-accessible file storage services, in accordance with one or more aspects of the present disclosure.

FIG. 3 depicts a flow diagram of one illustrative example of method 300 of facilitating access to files that are stored by network-accessible file storage services, in accordance with one or more aspects of the present disclosure. Method 300 and/or each of its individual functions, routines, subroutines, or operations may be performed by one or more processing devices of the computer system (e.g., the control node 130C of FIG. 1) implementing the method. In certain implementations, method 300 may be performed by a single processing thread. Alternatively, method 300 may be performed by two or more processing threads, each thread executing one or more individual functions, routines, subroutines, or operations of the method. In an illustrative example, the processing threads implementing method 300 may be synchronized (e.g., using semaphores, critical sections, and/or other thread synchronization mechanisms). Alternatively, the processing threads implementing method 300 may be executed asynchronously with respect to each other. In various illustrative examples, at least some of the operations described herein as being performed by the control node 130, may be performed by other components of the example distributed computer system 100.

At block 310, a processing device of a control node implementing the method may receive a file access request initiated by a client computing device. The file access request may comprises a file identifier, a file storage service identifier, and an access token associated with the file stored by the file storage service, as described in more details herein above.

At block 320, the processing device of the control node may request, using the access token, the metadata associated with the file from the file storage service. The file metadata may include the file size and other parameters of the file, as described in more details herein above.

At block 330, the processing device of the control node may define, using the received file metadata, a plurality of portions forming the file. In an illustrative example, all file portions except for the last one may have the same size, which may be provided by a pre-determine value of by a configurable parameter. Each file portion may be identified by its ordinal number in the sequence of file portions of a given file and/or by the offset of the respective portion relative to the top of the file, as described in more details herein above.

At block 340, the processing device of the control node may identify a plurality of file access nodes that may be employed to serve portions of the file to the requesting client computing device. In an illustrative example, the processing device may identify a certain number of file access nodes that currently have the minimal, among all nodes, workload. In yet another illustrative example, the processing device may identify a subset of the file access nodes that are geographically closest to the requesting client computing device. The number of control nodes may be determined based on the file size, e.g., by dividing the file size by a pre-determined value. In yet another illustrative example, the processing device may look up a hash table mapping file identifiers to file access node identifiers. In yet another illustrative example, the control node may identify all available file access nodes, as described in more details herein above.

At block 350, the processing device of the control node may forward the file metadata and the file access token to the plurality of file access nodes. The file metadata may include the file size, the size of a portion of the file to be transmitted to the client computing device, and/or a list of identifiers of the file portions, as described in more details herein above.

At block 360, the processing device of the control node may cause the list of identifiers of the plurality of file access nodes to be transmitted to the client computing device. In an illustrative example, the control node may transmit the list to the cloud infrastructure brokers for forwarding to the requesting client computing device, as described in more details herein above. Responsive to completing operations described with reference to block 360, the method may terminate.

Figure 4:
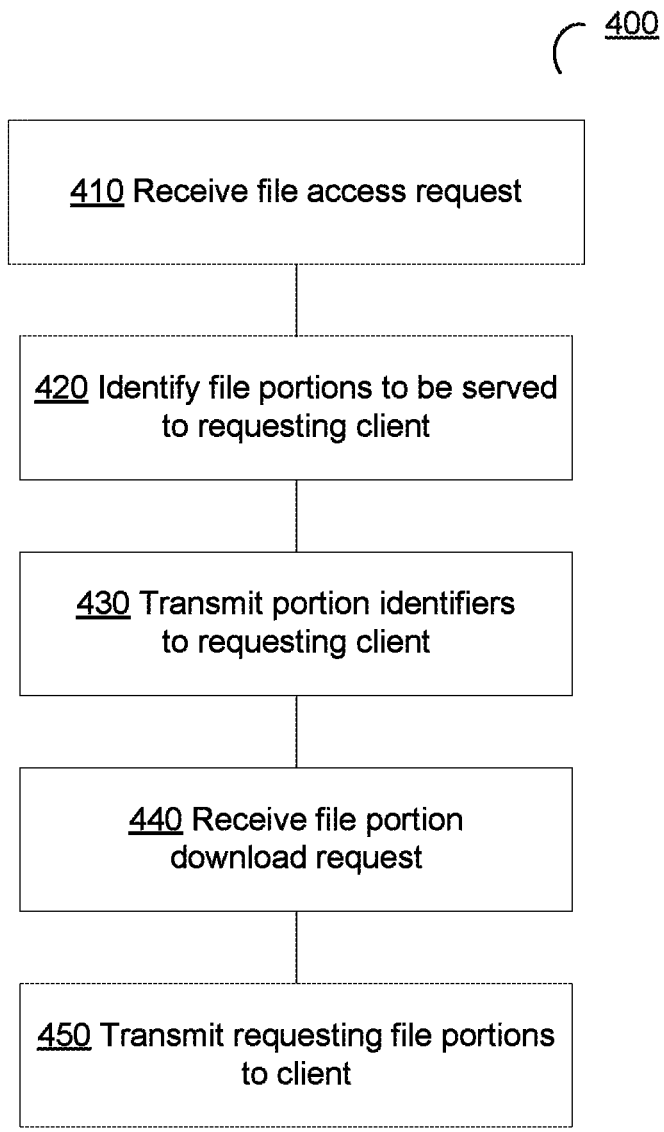
FIG. 4 depicts a flow diagram of one illustrative example of method performed by a file access node for facilitating access to files that are stored by network-accessible file storage services, in accordance with one or more aspects of the present disclosure.

FIG. 4 depicts a flow diagram of one illustrative example of method 400 of facilitating access to files that are stored by network-accessible file storage services, in accordance with one or more aspects of the present disclosure. Method 400 and/or each of its individual functions, routines, subroutines, or operations may be performed by one or more processing devices of the computer system (e.g., a file access node 130 of FIG. 1) implementing the method. In certain implementations, method 400 may be performed by a single processing thread. Alternatively, method 400 may be performed by two or more processing threads, each thread executing one or more individual functions, routines, subroutines, or operations of the method. In an illustrative example, the processing threads implementing method 400 may be synchronized (e.g., using semaphores, critical sections, and/or other thread synchronization mechanisms). Alternatively, the processing threads implementing method 400 may be executed asynchronously with respect to each other. In various illustrative examples, at least some of the operations described herein as being performed by the control node 140, may be performed by other components of the example distributed computer system 100.

At block 410, a processing device of a file access node implementing the method may receive a file access request originated by a client computing device. The file access request may comprises a file identifier, a file storage service identifier, and an access token associated with the file stored by the file storage service, as described in more details herein above.

At block 420, the processing device of the file access node may identify, using the file metadata supplied by the file access request, one or more portions of the file to be served to the client computing device. In an illustrative example, the processing device may optionally ascertain whether any of the file portions are stored in the local cache. Additionally or alternatively, the processing device may determine the number of file portions that it may stream to the client computing device without deteriorating own performance metrics beyond certain pre-determined thresholds. In an illustrative example, the processing device may determine the number of file portions to be served as being proportional to the ratio of the difference of the available network bandwidth and the first pre-defined threshold to the file portion size, as described in more details herein above.

At block 430, the processing device of the file access node may transmitting, to the requesting client computing device, a response comprising identifiers of the file portions that the file access node is prepared to serve. In an illustrative example, the processing device may randomly generate the requisite number of identifiers of the file portions, thus minimizing the probability of the client computing device receiving the same or substantially similar lists of file portion identifiers from two or more file access nodes, as described in more details herein above.

At block 440, the processing device of the file access node may receive a file portion download request initiated by the client computing device. The request may specify one or more file portion identifiers, as described in more details herein above.

At block 450, the processing device of the file access node may transmit the requested file portions to the client computing device. In an illustrative example, the file access node may retrieve the requested file portion from the local cache. Alternatively, responsive to failing to retrieve the requested file portion from the local cache, the file access node may stream the requested file portion from the file storage service to the client computing device, while optionally storing in the local cache the file portion being streamed, as described in more details herein above. Responsive to completing operations described with reference to block 450, the method may terminate.

Figure 5:
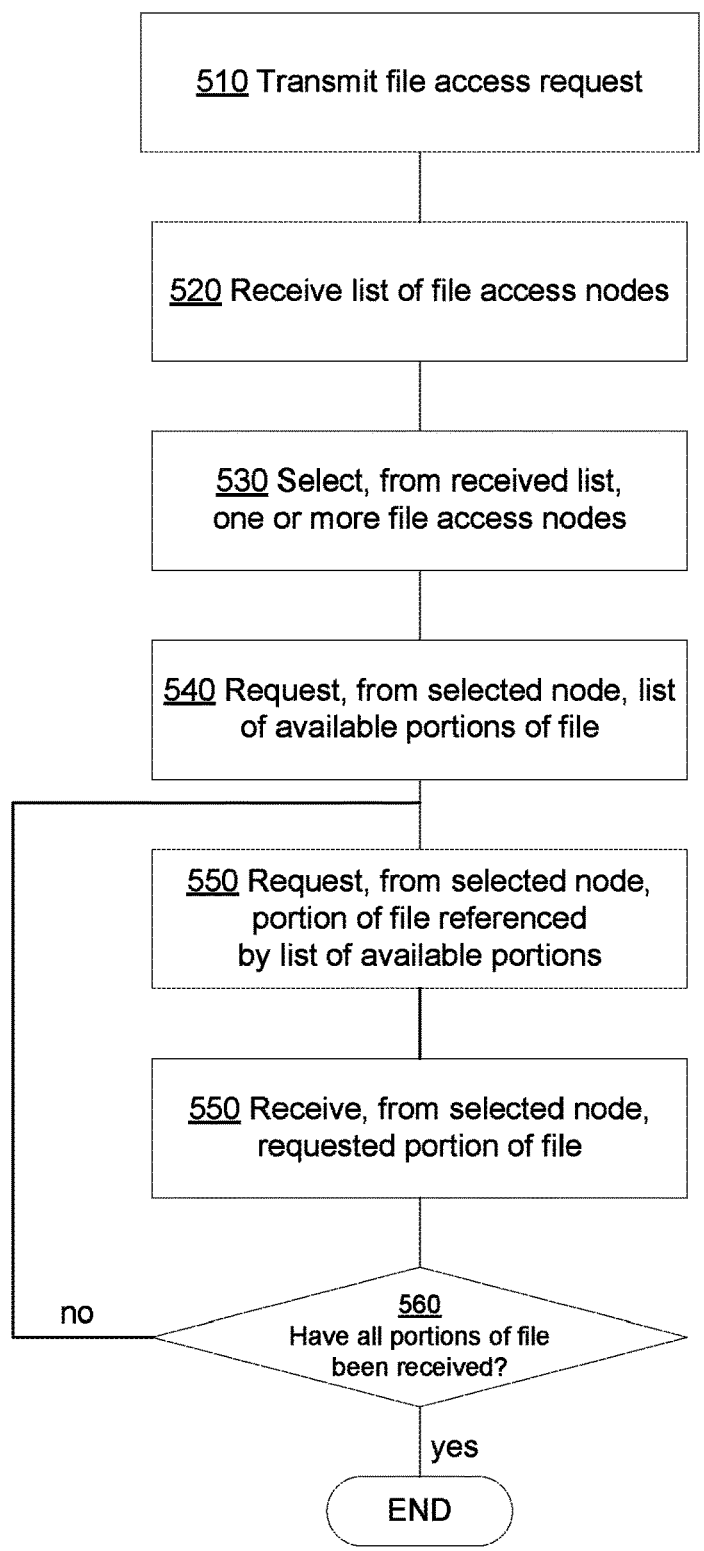
FIG. 5 depicts a flow diagram of one illustrative example of method performed by a client computing device for accessing files that are stored by network-accessible file storage services, in accordance with one or more aspects of the present disclosure.

FIG. 5 depicts a flow diagram of one illustrative example of method performed by a client computing device for accessing files that are stored by network-accessible file storage services, in accordance with one or more aspects of the present disclosure. Method 500 and/or each of its individual functions, routines, subroutines, or operations may be performed by one or more processing devices of the computer system (e.g., the client computing device 120 of FIG. 1) implementing the method. In certain implementations, method 500 may be performed by a single processing thread. Alternatively, method 500 may be performed by two or more processing threads, each thread executing one or more individual functions, routines, subroutines, or operations of the method. In an illustrative example, the processing threads implementing method 500 may be synchronized (e.g., using semaphores, critical sections, and/or other thread synchronization mechanisms). Alternatively, the processing threads implementing method 500 may be executed asynchronously with respect to each other. In various illustrative examples, at least some of the operations described herein as being performed by the control node 150, may be performed by other components of the example distributed computer system 100.

At block 510, a processing device of a client computing device implementing the method may transmit a file access request to a cloud infrastructure broker. The file access request may comprises a file identifier, a file storage service identifier, and an access token associated with the file stored by the file storage service, as described in more details herein above.

At block 520, the processing device of the client computing device may receive, from the cloud infrastructure broker, a list a plurality of file access nodes that are prepared to serve portions of the requested file, as described in more details herein above.

At block 530, the processing device of the client computing device may select, from the received list, one or more file access nodes for further requesting portions of the file, as described in more details herein above. In certain implementations, the processing device may ping the file access nodes and select one or more nodes demonstrating the best response time. In another illustrative example, the processing device may select one or more nodes associated with the network connections having the maximum available bandwidth among the network connections to the plurality of file access nodes, as described in more details herein above.

The operations described with references to blocks 540-560 may be performed, sequentially or in parallel, independently and asynchronously, with respect to one or more of the selected file access nodes.

At block 540, the processing device of the client computing device may request, from the selected file access node, a list of available portions of the file, as described in more details herein above.

At block 550, the processing device of the client computing device may request, from the selected file access node, a portion of the file referenced by the list of available portions, as described in more details herein above.

At block 560, the processing device of the client computing device may receive, from the selected file access node, the requested portion of the file, as described in more details herein above.

Responsive to determining, at block 570, that all portions of the file have been successfully received, the method may terminate; otherwise, the method may loop back to block 550.

Figure 6:
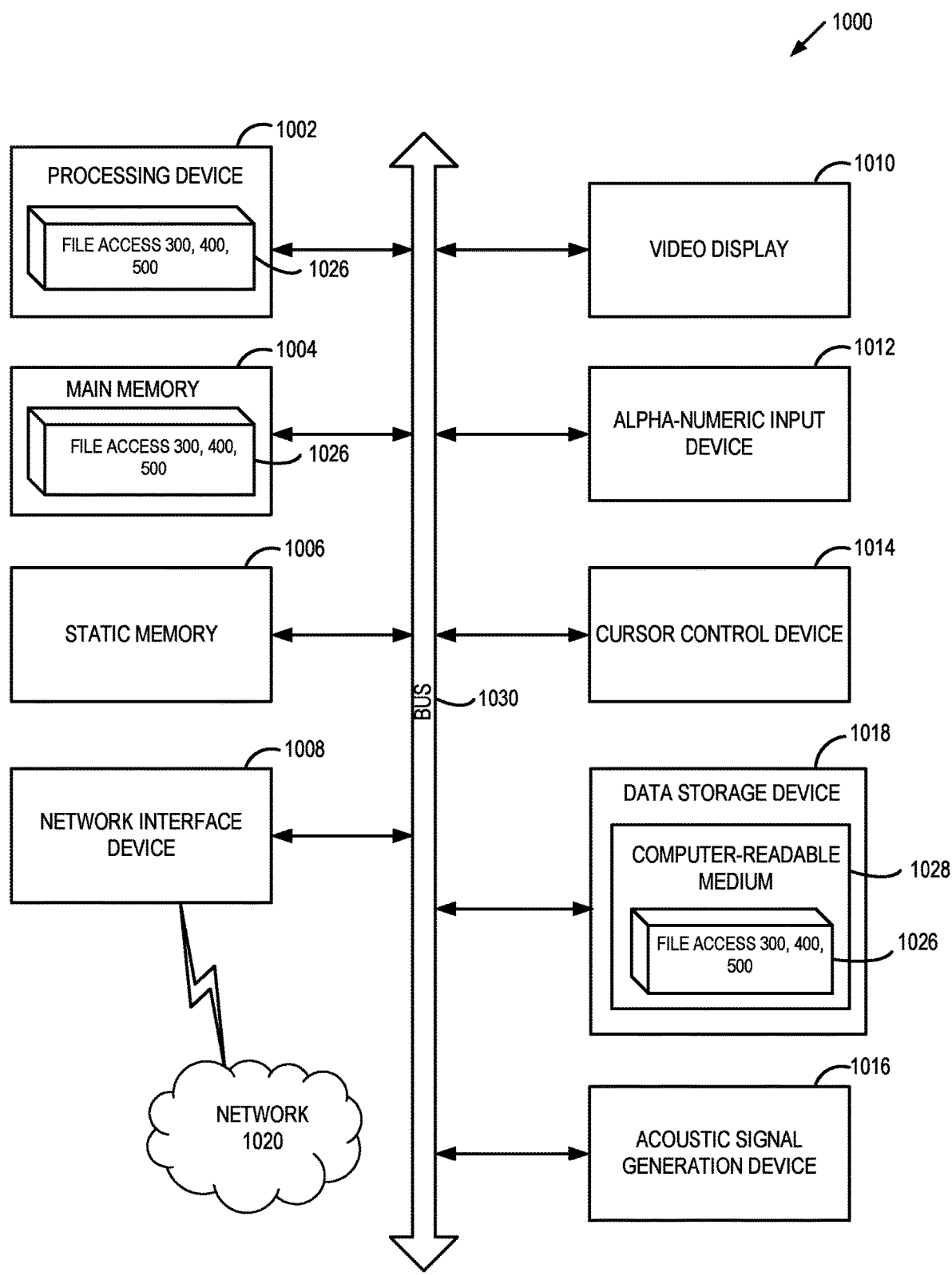
FIG. 6 depicts a block diagram of an example computer system that may implement the methods of the present disclosure.

FIG. 6 schematically illustrates a component diagram of an example computer system 1000 which may perform any one or more of the methods described herein. In various illustrative examples, computer system 1000 may represent a client computing device 120, a file access node 130, or a cloud infrastructure broker 150 of FIG. 1.

Example computer system 1000 may be connected to other computer systems in a LAN, an intranet, an extranet, and/or the Internet. Computer system 1000 may operate in the capacity of a server in a client-server network environment. Computer system 1000 may be a personal computer (PC), a set-top box (STB), a server, a network router, switch or bridge, or any device capable of executing a set of instructions (sequential or otherwise) that specify actions to be taken by that device. Further, while only a single example computer system is illustrated, the term "computer" shall also be taken to include any collection of computers that individually or jointly execute a set (or multiple sets) of instructions to perform any one or more of the methods discussed herein.

Example computer system 1000 may comprise a processing device 1002 (also referred to as a processor or CPU), a main memory 1004 (e.g., read-only memory (ROM), flash memory, dynamic random access memory (DRAM) such as synchronous DRAM (SDRAM), etc.), a static memory 1006 (e.g., flash memory, static random access memory (SRAM), etc.), and a secondary memory (e.g., a data storage device 1018), which may communicate with each other via a bus 1030.

Processing device 1002 represents one or more general-purpose processing devices such as a microprocessor, central processing unit, or the like. More particularly, processing device 1002 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 1002 may also be one or more special-purpose processing devices such as an application specific integrated circuit (ASIC), a field programmable gate array (FPGA), a digital signal processor (DSP), network processor, or the like. In accordance with one or more aspects of the present disclosure, processing device 1002 may be configured to execute instructions implementing methods 300, 400 and/or 500 for facilitating access to files that are stored by network-accessible file storage services.

Example computer system 1000 may further comprise a network interface device 1008, which may be communicatively coupled to a network 1020. Example computer system 1000 may further comprise a video display 1010 (e.g., a liquid crystal display (LCD), a touch screen, or a cathode ray tube (CRT)), an alphanumeric input device 1012 (e.g., a keyboard), a cursor control device 1014 (e.g., a mouse), and an acoustic signal generation device 1016 (e.g., a speaker).

Data storage device 1018 may include a computer-readable storage medium (or more specifically a non-transitory computer-readable storage medium) 1028 on which is stored one or more sets of executable instructions 1026. In accordance with one or more aspects of the present disclosure, executable instructions 1026 may comprise executable instructions encoding various functions of methods 300, 400 and/or 500 for facilitating access to files that are stored by network-accessible file storage services.

Executable instructions 1026 may also reside, completely or at least partially, within main memory 1004 and/or within processing device 1002 during execution thereof by example computer system 1000, main memory 1004 and processing device 1002 also constituting computer-readable storage media. Executable instructions 1026 may further be transmitted or received over a network via network interface device 1008.

While computer-readable storage medium 1028 is shown in FIG. 6 as a single medium, the term "computer-readable storage medium" should be taken to include a single medium or multiple media (e.g., a centralized or distributed database, and/or associated caches and servers) that store the one or more sets of VM operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "determining," "storing," "adjusting," "causing," "returning," "comparing," "creating," "stopping," "loading," "copying," "throwing," "replacing," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus may be specially constructed for the required purposes, or it may be a general purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the scope of the present disclosure is not limited to any particular programming language. It will be appreciated that a variety of programming languages may be used to implement the teachings of the present disclosure.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but may be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

What is claimed is:

1. A method, comprising:
receiving, by a computer system implementing a control node, a file access request initiated by a client computing device, wherein the file access request comprises an identifier of a file, an identifier of a file storage service, and an access token associated with the file stored by the file storage service;

requesting, using the access token, metadata associated with the file from the file storage service;

defining, using the metadata, a plurality of portions forming the file;

identifying a plurality of file access nodes associated with the file storage service, wherein a number of the file access nodes is determined based on a size of the file; and forwarding, to the plurality of file access nodes, identifiers of the plurality of portions.

2. The method of claim 1, further comprising:

causing a transmission of the identifiers of the plurality of file access nodes to the client computing device.

3. The method of claim 1, wherein identifying the plurality of file access nodes comprises performing a lookup in a hash table mapping file identifiers to file access node identifiers.

4. The method of claim 1, wherein the metadata associated with the file includes the size of the file.

5. The method of claim 1, wherein an identifier of a portion is represented by a byte positions defining an offset of the portion relative to a top of the file.

6. The method of claim 1, wherein the computer system is further configured to act as a file access node of the plurality of the file access nodes, the method further comprising:

identifying, in view of a current workload of the file access node, one or more portions of the file to be served to the client computing device; and transmitting, to the client computing device, a response comprising identifiers of the portions.

7. The method of claim 1, further comprising:

causing, based on monitoring current workloads of the plurality of file access nodes, a new file access node to be provisioned.

8. The method of claim 1, further comprising:

causing, based on historical data reflecting workloads of the plurality of file access nodes, a new file access node to be provisioned.

9. A method, comprising:

receiving, by a file access node, a file access request originated by a client computing device, the file access request comprising an identifier of a file;

identifying, in view of metadata associated with the file, a plurality of portions of the file to be served to the client computing device, wherein a number of the portions of the file is determined based on an available network bandwidth between the file access node and the client computing device; and transmitting, to the client computing device, a response comprising identifiers of the portions of the file.

10. The method of claim 9, wherein the identifiers of the plurality of portions of the file are represented by byte positions defining an offset of a respective portion relative to a top of the file.

11. The method of claim 9, wherein identifying the portions of the file is performed based on a current workload of the file access node.

12. The method of claim 9, wherein identifying the portions of the file comprises inspecting a local cache of the file access node.

13. The method of claim 9, further comprising:

receiving, from the client computing device, a portion download request identifying a portion of the file;

retrieving the portion of the file from a local cache; and transmitting the portion of the file to the client computing device.

14. The method of claim 9, further comprising:

receiving, from the client computing device, a portion download request identifying a portion of the file; and streaming the portion of the file from a file storage service to the client computing device.

15. The method of claim 14, wherein the streaming the portion of the file comprises storing the portion of the file in a local cache.

16. A system, comprising:

a memory; and a processor coupled to the memory, wherein the processor is configured to:

receive a file access request initiated by a client computing device, wherein the file access request comprises an identifier of a file, an identifier of a file storage service, and an access token associated with the file stored by the file storage service;

request, using the access token, metadata associated with the file from the file storage service;

define, using the metadata, a plurality of portions forming the file;

identify a plurality of file access nodes associated with the file storage service, wherein a number of the file access nodes is determined based on a size of the file; and forward, to the plurality of file access nodes, identifiers of the plurality of portions.

17. The system of claim 16, wherein the processor is further configured to:

forward, to the client computing device, identifiers of the plurality of file access nodes.

18. A method, comprising:

transmitting, by a client computing device, a file access request comprising an identifier of a file, an identifier of a file storage service, and an access token associated with the file stored by the file storage service;

receiving identifiers of a plurality of file access nodes associated with the file storage service;

selecting, based on evaluating a network bandwidth between the client computing device and a file access node, the file access node of the plurality of file access nodes;

requesting, from the selected file access node, a list of available portions of the file;

requesting, from the selected file access node, a portion of the file referenced by the list of available portions; and receiving, from the selected file access node, the requested portion of the file.

19. The method of claim 18, wherein selecting the file access node further comprises:

evaluating a response time by the file access node.

* * * * *